A. L. STEERE.
PEANUT PLANTER.
APPLICATION FILED JUNE 30, 1917.
1,276,588.
Patented Aug. 20, 1918.
3 SHEETS—SHEET 1.
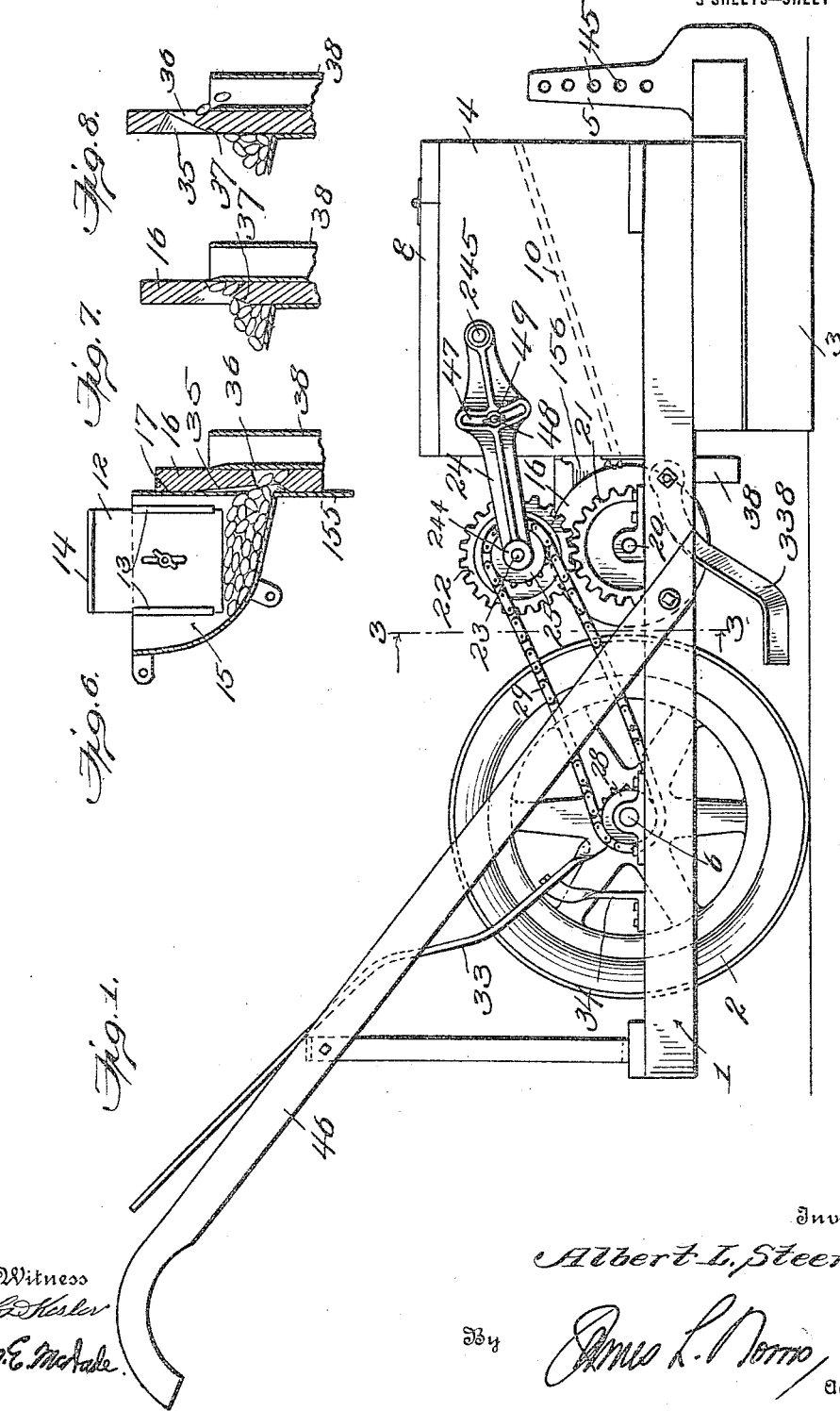
Witness
Inventor
Albert L. Steere
By
Attorney

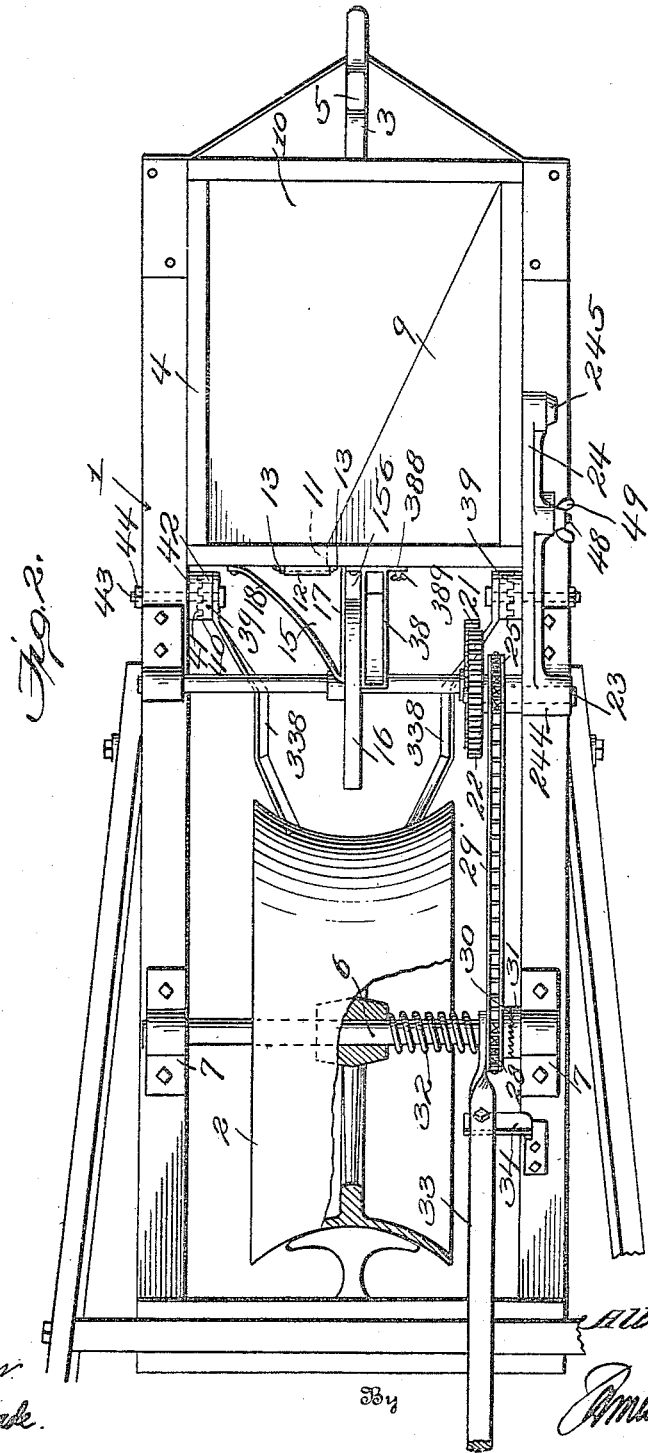

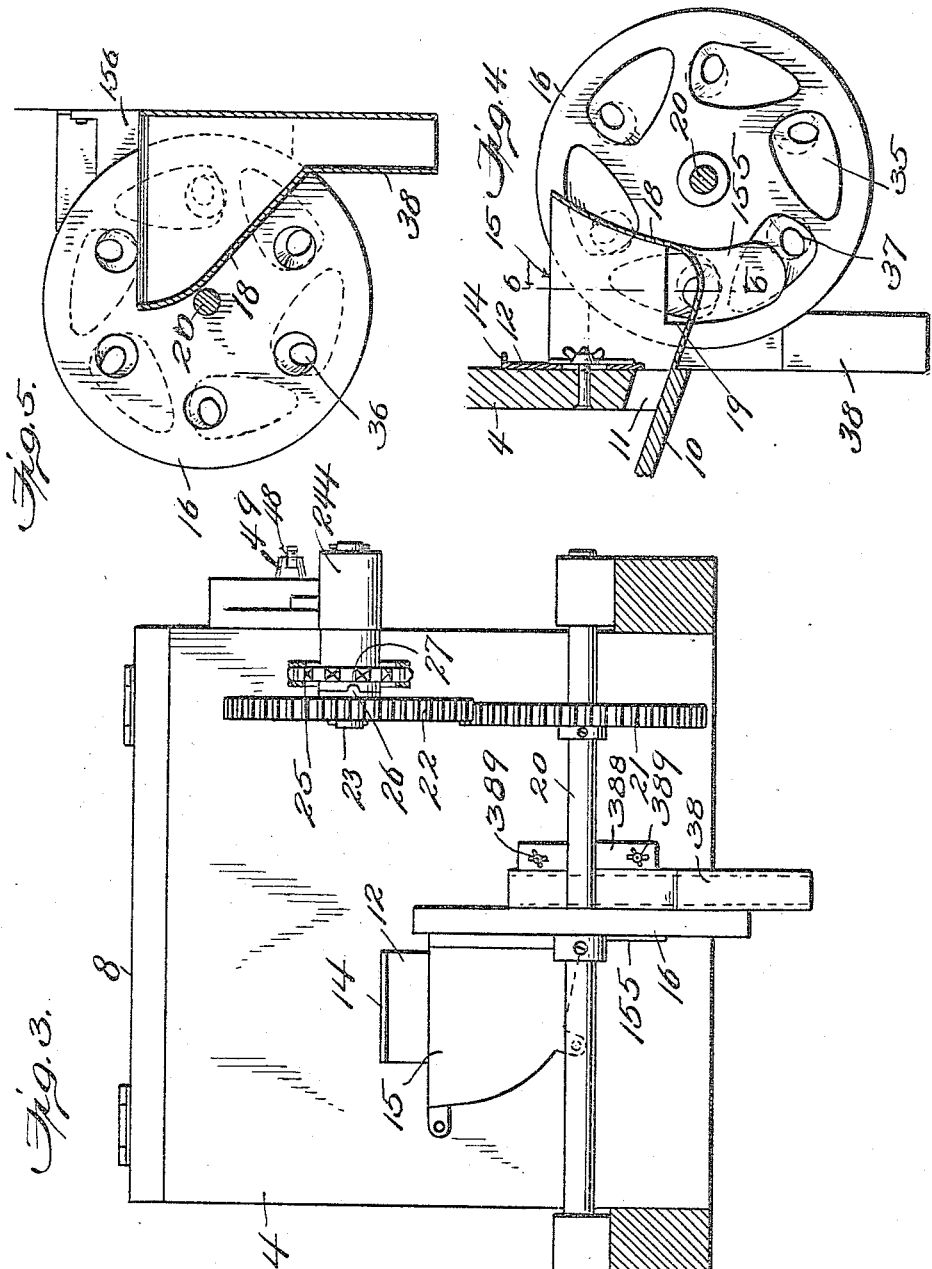

UNITED STATES PATENT OFFICE.

ALBERT L. STEERE, OF PETERSBURG, VIRGINIA, ASSIGNOR TO APPOMATTOX IRON WORKS AND SUPPLY COMPANY, OF PETERSBURG, VIRGINIA, A CORPORATION OF VIRGINIA.

PEANUT-PLANTER.

1,276,588.

Specification of Letters Patent.   Patented Aug. 20, 1918.

Application filed June 30, 1917.   Serial No. 178,019.

*To all whom it may concern:*

Be it known that I, ALBERT L. STEERE, a citizen of the United States, residing at Petersburg, in the county of Dinwiddie and State of Virginia, have invented new and useful Improvements in Peanut-Planters, of which the following is a specification.

The present invention relates to planters, and more particularly to that type of planters wherein the "seed", so called, are supplied from a hopper to a rotary wheel, plate or disk, which is formed with a series of pockets, the latter being utilized to deliver the seed, in predetermined number, to a discharge spout, through which they are dropped into the furrow during the rotation of the wheel. It proposes certain improvements, hereinafter fully described, in or relating to the feed wheel and associated parts, whereby the rapidity of feed may be increased or decreased to suit existing conditions, and whereby the picking up of the seed by the pockets, and their delivery from the same to the dropper in the required quantities are facilitated; and it also comprises certain further improved features relating, notably, to the means for closing and tamping the furrow behind the dropper as the travel of the machine proceeds.

The improved implement is designed primarily for use in planting peanuts, and will, in fact, be so shown and described; but it is to be understood that no limitation to such use is contemplated, as will be apparent from the foregoing, since the term "seed", as employed above, and in the appended claims, is used in its generic sense as covering both the nut meats or kernels, and vegetable and other seed in the more restricted meaning of the term. Similarly, the invention is not to be considered as limited to the precise structural details disclosed excepting in so far as such limitations are actually imposed by the language of said claims.

In the accompanying drawing:

Figure 1 is a side elevation of the complete implement.

Fig. 2 is an enlarged, fragmental plan view of the forward portion of the implement.

Fig. 3 is a transverse, vertical section, on a further enlarged scale, taken substantially on line 3—3, Fig. 1, but with parts omitted for clearness of illustration.

Figs. 4 and 5 are detail views of the feed wheel, taken from opposite sides thereof.

Figs. 6 to 8 are detail sectional views, showing the feeding action of said wheel in its successive stages, and taken on line 6—6, Fig. 4.

As shown in said drawing, the improved implement primarily embodies an open or skeleton rectangular frame 1, supported adjacent its rear end by a ground wheel 2, and provided at its front end with a suitable furrow opener 3, the latter arranged beneath and fastened to a hopper 4 and having a central, upstanding terminal post 5 at its front end. The ground wheel 2 is mounted upon a transverse shaft or axle 6, and is formed with a concave tread or periphery, which serves to cover over and press down the previously closed furrow, as hereinafter explained, the ends of said axle being journaled in bearings 7 fastened to the side bars of the frame.

The hopper 4 is here shown as in the form of a box or casing, closed at its top by a hinged lid 8 and provided interiorly with a false inner side 9 which slopes toward the downwardly and rearwardly inclined bottom 10 to cause the nuts to gravitate toward and feed through the opening 11 in the rear wall of the hopper, the feed being controlled by a device which, in the construction illustrated, consists of a sliding gate 12, fitted in guides 13 arranged against the outer face of the hopper wall and provided at its top with an out-turned flange or operating handle 14. On passing through the opening 11, the nuts enter a chute 15, which delivers them to the pocketed feed wheel 16, this chute 15 having its inner wall 17 disposed substantially flush against the adjacent face of said feed wheel, and its outer wall 18 slightly curved and arranged at such an angle to the first-named wall as to hold the nuts against the same, so that they will be crowded toward the delivery opening 19 in said wall.

The feed wheel 16, which presents the most important features of the invention, is mounted directly in rear, and preferably centrally, of the hopper upon a horizontal shaft 20, whose ends are likewise journaled in bearings carried by the frame sides. The shaft 20 is driven from the shaft or axle 6 in such a way that its speed of rotation may be varied to suit different conditions, and, also, that its actual rotation may be started and stopped at will. According to the embodiment here shown, which may be considered for all practical purposes as preferred, the aforesaid shaft 20 has secured to it a gear 21 that meshes with and is driven by a gear 22, removably mounted on a pin or stub shaft 23, the latter being carried by the sleeved end 244 of a bracket 24, which is fastened to the adjacent side wall of the hopper. The gear 22 is releasably coupled to a sprocket 25, also loose on pin 23, so as to rotate in unison with the sprocket, the coupling being effected in any suitable manner, for instance by providing the hub of one of said parts with a transverse rib 26, and the hub of the other part with a groove 27 to receive said rib. The sprocket 25 is connected, in turn, to a loose sprocket 28 on the axle 6 by a chain 29, the latter sprocket being provided with a clutch face 30, which is normally forced into engagement with a fixed clutch member 31 on said axle through the action of an expansible spring 32 that encircles the axle. Hence, when the implement is being drawn through the field, the rotation of the ground wheel will be transmitted through its axle to the front sprocket 25, assuming that the clutch is closed, and thence to the feed wheel shaft 20. The clutch may, however, be opened when desired by shifting the clutch sprocket 28 away from the fixed clutch member, a suitable lever 33 being provided for that purpose and being fulcrumed on a bracket 34 secured to the adjacent side bar of the frame.

The feed wheel 16, as previously stated, is formed with a series of pockets, whose function is to pick up the nuts from the chute 15 and deliver them to a spout or dropper, indicated at 38. According to the present construction, these pockets, six of which are represented in Figs. 4 and 5, extend through the feed wheel, but are differently shaped on opposite sides thereof. The portions 35, Fig. 4, formed in the inner face of the wheel are of the clam-shell type; that is to say, they are substantially spatulate in shape, and increase gradually in depth from their narrow front ends to their relatively wide rear or butt ends, so that the said portions will pick up the nuts during the rotation of the wheel. The outer portions 36 of the pockets are substantially frusto-conical in shape, as shown in Fig. 5, and their axes are disposed at an acute angle to the supporting shaft 20, so that they open at an angle into the aforesaid inner portions, as will be apparent upon consideration of Figs. 6 to 8, the openings themselves being approximately elliptical in shape and just large enough to permit the nuts to pass therethrough two at a time. In consequence of this construction, an inverted V-shaped ledge 37 will be formed at the rear end of each pocket by the intersection of the outer and inner portions 35 and 36 thereof, half of such ledge being comprised in the outer portion and the other half in the inner portion; and this ledge, as the rotation of the wheel proceeds, serves to retain the two nuts in the outer portion of the pocket and to alternately discharge them into the top of the dropper.

Referring to Figs. 4 to 8, it will be observed that the pockets approach the chute 15 point foremost; and as they pass the opening 19 in the chute wall 17 their shell-shaped inner portions 35 will pick up a number of the nuts. At that time, the ledge 37 of the pocket then opposite the said opening will be substantially in line with the bottom of the chute, so that the nuts will tend to pass into the outer portion 36, which, as stated above, is just large enough to receive two of them; see Fig. 6. The pockets are arranged in an approximately circular series, disposed concentric with the shaft 20, from which it follows that by the time the wheel has moved into Fig. 7 position, the nuts originally contained in the inner pocket section will have dropped back into the chute, while the two contained in the outer section will be held in the wedge-shaped space between the inclined outer wall of the ledge 37 and the perpendicular inner wall of the dropper, the latter wall having the same relative position to the outer face of the feed wheel as the chute wall 17 has to the inner face thereof. As the wheel continues its rotation, the pocket is carried up still higher until it reaches the position represented in Fig. 8, in which the said outer wall of the ledge is above the upper edge of the dropper, whereupon the two nuts fall from the outer pocket section into said dropper and are discharged from the lower end thereof into the furrow, it being understood that the discharge end of the dropper is positioned with that object in view.

In order to close the furrow as the implement continues its progress, suitable devices are provided in rear of the hopper, these devices being here shown as in the nature of a pair of narrow plates 338, whose front or upper portions are connected to the frame sides, and whose rear portions are bent downwardly and rearwardly so as to wipe along the furrow from opposite sides. These bars are preferably so constructed as to permit them to be set at different angles to suit furrows of different depths, or, if desired, to throw them into ineffective position. Accordingly, their front ends are enlarged to form heads 39 which are provided upon their inner faces with teeth 40, for co-action with similarly arranged teeth 41 formed on the inner faces of a pair of plates 42 disposed against the inner faces of the frame sides, the pairs of plates and heads being clamped together and fastened to said frame sides by bolts 43, equipped with tightening nuts 44, as shown in Fig. 2. The bars, however, exercise merely a superficial closing action upon the furrow, the final closing or covering being effected by the concave periphery of the ground wheel 2, which is arranged in line with the furrow opener, so that it will ride over and, to some extent at least, pack down the earth on the top of the furrow.

The standard or post 5 on the front end of the furrow opener is provided with a vertical series of perforations 45, to permit the adjustable attachment of a clevis or the like (not shown) thereto; and the frame is provided with the usual guide handles 46 which are fastened at their lower extremities to the frame sides and may be supported and braced in any desired manner.

The operation of the implement as above described is believed to be fully apparent, the feed of the nuts taking place at regular intervals. It is an important feature of the invention, however, to provide means whereby the periods intervening between succeeding discharges may be increased or decreased, or, in other words, whereby the feed may be accelerated or retarded, with a proportionate variation in the distance between the deposits in the furrow. This variation may be effected by mounting the supporting-pin bracket 24 in such a way that it can be raised or lowered, thus permitting gears of larger or smaller diameter than the gear 22 to be substituted for that gear. Accordingly, the said bracket 24, which is pivoted at its front end at 245 to the hopper side, and carries the supporting sleeve 244 at its rear end, is provided intermediate its ends with an arcuate slot 47, through which projects a horizontal threaded pin or bolt 48 that is fixed to the hopper and is furnished at its outer end with a clamping nut 49; such construction enabling the bracket to be set to the required position to receive the different sized driving gears, as will be understood, with the result that the speed of rotation of the feed wheel relative to the rate of travel of the implement is correspondingly varied. If desired, moreover, the sprocket 25, which is coupled to drive the aforesaid gear 22, may also be removed and replaced by a larger or smaller sprocket, thus providing a further variation in the speed of the feed wheel.

Further description of the invention, its construction, mode of operation and advantages, is believed to be unnecessary in view of the foregoing, and is, accordingly, omitted. It may be stated, however, that the chute 15 is preferably provided at its delivery end with a depending apron or guard 155 (Figs. 3, 4 and 6), which is formed integrally therewith and extends directly across the inner face of the feed wheel 16, so as to completely prevent the nuts, on entering the ascending pocket, from falling out therefrom. Also, it is preferable to fill in the space between the feed wheel and the rear wall of the hopper 4, to avoid any danger of the nuts falling into this space on being discharged from the pockets as the latter reach the top of the dropper, 38; and for that purpose, a block 156 (Figs. 1 and 5) may be utilized, said block having a concave rear face, as shown, and being either rigidly or adjustably mounted, according as may be desired. Finally, the said dropper 38 may advantageously be mounted for vertical adjustment on the aforesaid rear wall of the hopper 4, for which purpose it is provided with a lateral flange 388, having a slot-and-bolt connection 389 with said hopper wall, as represented in Fig. 3.

I claim as my invention:

1. In a planter, the combination of a seed-containing hopper, a rotary feed wheel formed with a series of pockets which open through its opposite sides and have inner angularly intersecting reversely inclined walls, each of the said pockets comprising an inner enlarged section which initially receives the seeds from the said hopper, and an outer section into which the seeds pass from the inner section over the said reversely inclined walls, said outer section adapted to carry the seeds partway around therein and then discharge them at a predetermined point, and means for driving the said wheel.

2. In a planter, the combination of a seed-containing hopper; a rotary feed wheel formed with a series of pockets which open through its opposite faces; a dropper having a flat wall arranged against the outer face of the feed wheel; each pocket of said wheel comprising an inner section adapted to initially receive the seeds from said hopper, and an outer section into which the seeds pass from said inner section adapted to carry the seeds across said dropper wall and discharge them over the edge thereof into the dropper; and means for driving said feed wheel.

3. In a planter, the combination of a seed-containing hopper; a rotary feed wheel formed with a series of pockets which open through its opposite faces; a dropper having a flat wall arranged against the outer face of the feed wheel; each pocket of said wheel comprising an inner section adapted to initially receive the seeds from said hopper, and an outer section into which the seeds pass from said inner section adapted to carry the seeds across said dropper wall and discharge them over the edge thereof into the dropper, the formation of said inner and outer sections producing a V-shaped ledge between them to assist in discharging the surplus seeds from the inner section back into the hopper and in retaining the seeds in the outer section during their travel across the dropper wall; and means for driving said feed wheel.

In testimony whereof I have hereunto set my hand in presence of two subscribing witnesses.

ALBERT L. STEERE.

Witnesses:
  LUCY B. SHACKELFORD,
  BESSIE F. EDMUNDS.

Copies of this patent may be obtained for five cents each, by addressing the "Commissioner of Patents, Washington, D. C."